Oct. 8, 1940.                R. R. MACHLETT                2,216,888
                              X-RAY TUBE
                          Filed July 19, 1939
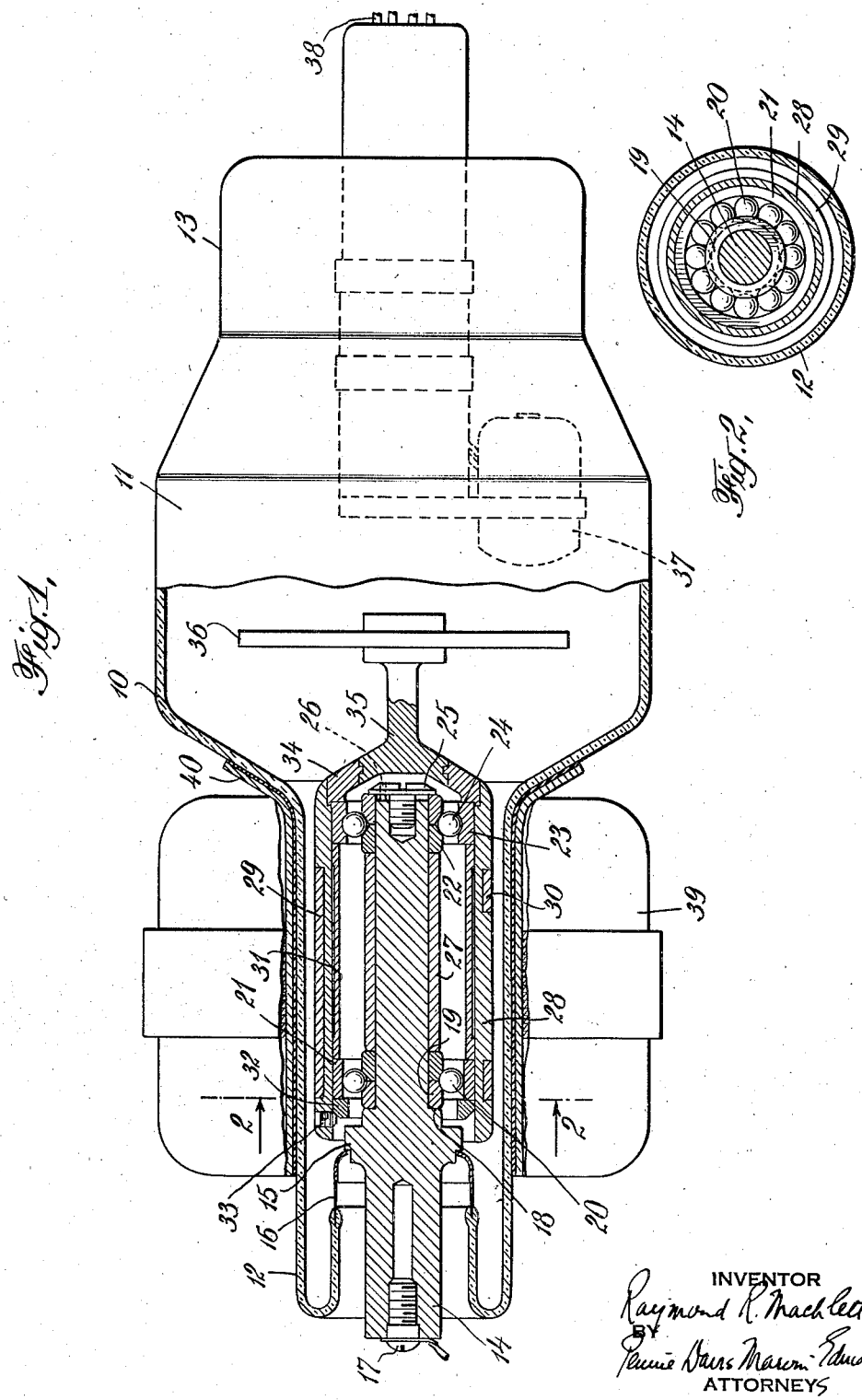
INVENTOR
Raymond R. Machlett
BY
Pennie Davis Marvin Edmonds
ATTORNEYS Patented Oct. 8, 1940

2,216,888

UNITED STATES PATENT OFFICE 2,216,888

X-RAY TUBE

Raymond R. Machlett, Riverside, Conn., assignor to Machlett Laboratories Incorporated, Springdale, Conn., a corporation of Connecticut Application July 19, 1939, Serial No. 285,273

12 Claims. (Cl. 250—148)

This invention relates to X-ray tubes of the type in which the anode includes a target rotated during the operation of the tube in order that the area of the target on which the electron stream impinges may be constantly changed and damage to the target may be prevented. More particularly, the invention is concerned with a novel anode structure for use in such tubes, which includes a target so mounted that it can be rotated freely and with little power consumption over a long life.

In rotary target X-ray tubes as heretofore constructed, the target is either attached to a shaft mounted in suitable bearings on one or more supports within the tube envelope, or else is carried by a hollow cylindrical member running on bearings on a support sealed through the envelope wall and extending into the interior of the member. The latter construction is that commonly employed in modern tubes and the support usually takes the form of a stem of copper having a cross-sectional area of substantial size. The cylindrical member is then used as the rotor of the motor by which the target is rotated and it is ordinarily made of ferromagnetic material and carries copper in an arrangement similar to the squirrel cage of an induction motor.

Both sleeve and roller bearings have been used for supporting the rotary member carrying the target and both types of bearing, as heretofore used, are open to objection. With sleeve bearings, a lubricant must be used and, under normal conditions of operation, the lubricants available gasify and this shortens the life of the tube. Roller bearings are better for the purpose than sleeve bearings in that they may be run without lubricant, and such roller bearings are ordinarily employed in pairs with one bearing at each end of the rotor and with the outer races secured against longitudinal movement relative to the rotor and the inner races similarly secured to the stem. The races of each bearing have channels in their opposed faces and the balls run in the channels, so that the rotor turns freely on the stem, but is held against longitudinal movement relative thereto.

The roller bearing system above described avoids the difficulties caused by the use of lubricants required with sleeve bearings, but has other disadvantages arising from differential heating of the rotor and stem during operation and the resultant differential thermal expansion thereof. Thus, when energization of the tube is started, the rotor is heated first, but heat conduction through the bearing system is so poor that the temperature of the stem rises much more slowly. Accordingly, if energy is put into the tube rapidly, the rotor will assume a relatively high temperature before there is any considerable rise in the temperature of the stem, although if the energy is put into the tube very slowly, the rotor and stem may rise in temperature at about the same rate. If, after a period of use, the energy input is cut off, the stem will lose heat through the part which extends out of the tube and into the oil in which such tubes are usually immersed and will thus cool off more rapidly than the rotor. As a result of this differential heating action, the rotor and stem expand unequally and the races of one bearing are shifted relatively to one another along the axis of rotation of the rotor. This shift causes the balls of that bearing to be squeezed by the side walls of the channels in the races and high resistance to rotation is developed which may be sufficient to prevent the rotor from turning. The difficulties resulting from such temperature variations in the rotor and stem are further aggravated by the difference in the rates of expansion of the different metals employed in the construction of these parts.

In an attempt to avoid the disadvantages resulting from the differential heating effect, it has been proposed to construct the tube with one race of one of the bearings mounted movably with respect to the rotor or stem. The purpose of this arrangement is to permit relative movement lengthwise of the axis of rotation between that race and the part on which it is mounted. This construction is only temporarily satisfactory, however, because in the course of use, the movable race causes wear of the rotor or stem which, in time, prevents the race from moving freely relatively thereto. Thereafter, the race is held firmly in position and the difficulties which the movable race was intended to overcome recur.

The present invention is, accordingly, directed to the provision of a novel anode structure, including a rotary target, for use in X-ray tubes, which is devoid of the objectionable features above mentioned, in that the target may be rotated freely during long periods of use and with little energy consumption. The new structure comprises a support within the envelope, a rotary member carried by the support for rotation with respect thereto, a target attached to the member, and bearings between the support and member. The bearings used include inner and outer races between which run rolling elements, such as balls. One race of each bearing is held against movement relative to the support in a direction lengthwise thereof and the other race is held against movement relative to the rotary member in the direction referred to. The races of one bearing are formed with opposed channels in which the rolling elements are confined in a direction lengthwise of the support and one race of the second bearing is similarly channeled. The other race of the second bearing has an inner face which permits the elements in contact therewith to move in a direction lengthwise of the support and member. With this construction, the support and rotary member are held against relative longitudinal movement by one bearing, and the action of the second bearing is not affected by the differential expansion of the support and rotary member arising from differential heating or from their being formed of different materials.

For a better understanding of the invention, reference may be made to the accompanying drawing in which:

Fig. 1 is a view partly in elevation and partly in longitudinal section of an X-ray tube provided with the anode structure of the invention; and Fig. 2 is a sectional view on the line 2—2 of Fig. 1.

The tube disclosed in the drawing comprises an envelope 10 having an enlarged central section 11 and reduced neck portions 12 and 13. These necks have re-entrant end portions and sealed through the re-entrant end of the neck 12 is a stem 14 made of copper and having a substantial cross-section. The stem is provided with a portion 15 of enlarged diameter which is inside the tubular metallic seal 16, and at the exposed end of the stem, a terminal screw 17 is threaded into the stem and provides means by which an electrical connection can be made.

Inward from the enlarged section, the stem is formed with a shoulder 18 against which is seated the inner race 19 of a ball bearing which includes balls 20 and an outer race 21. The outer face of the inner race has a circumferential channel within which the balls run and by which they are confined against movement in a direction lengthwise of the stem. As illustrated, the inner race is made of two parts but may be of unitary construction, if desired. The outer race has a smooth inner face with which the balls make contact.

At the free end of the stem is another ball bearing including a split inner race 22 having a channel in its outer face, an integral outer race 23 having a channel in its inner face, and a plurality of balls 24 running in the channels and confined thereby. The inner race 22 is secured in position by the head of a screw 25 threaded into the free end of the stem, the screw being held in place by a pin 26 passing through an opening through the head thereof and into a bore in the stem. A sleeve 27 surrounds the stem and maintains the inner races of the ball bearings against movement toward one another.

Surrounding the stem within the envelope is a cylindrical member 28 formed of iron and having longitudinal copper bars 29 embedded therein and connecting copper rings 30 similarly embedded in the cylindrical member. The outer races 21 and 23 of the ball bearings lie in contact with the inner surface of the cylindrical member and are held against movement relative to one another by a sleeve 31 lying between them. A ring 32 is disposed within the cylinder in contact with the outer edge of the race 21 and this ring is held in place by one or more set screws 33 threaded through the cylinder and contacting with the ring. The race 23 is held against movement out of the cylinder by a frusto-conical member 34 secured to the cylinder and supporting a stem 35 of a metal of low-heat conductivity on which is mounted a target disc 36.

The tube includes a cathode structure 37 of suitable construction supported on the re-entrant end portion of neck 13, the cathode including one or more filaments supplied with current through leads 38. During the operation of the tube, the cylindrical member 28 is rotated and for this purpose a stator, generally designated 39, is mounted on the neck 12, a sleeve of dielectric material 40 being interposed between the stator and the neck.

In the operation of the tube, the cylindrical member is rotated by the action of the field produced by the stator on the rotor consisting of the ferromagnetic cylinder and the copper squirrel cage embedded therein. As the tube heats up, the rotor and stem expand but at different rates, partly because of the differential heating action and partly because of the difference of the metals used for the stem and cylinder. The ball bearing adjacent the free end of the stem has channels in its inner and outer races in which the balls run and, since these races are secured to the stem and rotary member, respectively, against movement lengthwise thereof, the adjacent portions of the stem and rotary member maintain their relative positions. The bearing near the other end of the stem has an outer race which is unchanneled so that this race and the balls, which are in contact with it and are held by the channels of the inner race of that bearing, may be moved relatively lengthwise of the stem and rotor. Accordingly, when the rotor and stem expand unequally either because of unequal heating or of the difference in the metals used, the races 19 and 21 are shifted relatively and, since race 21 has a flat inner face, such relative movement in no way interferes with the circumferential movement of the balls between these races. As a consequence, both bearings function satisfactorily regardless of the temperature of the rotor and stem and there is no wedging of the balls of one of the bearings. The target of the new tube may, therefore, be rotated with little power consumption regardless of the rate of energy input, the duration of operation, or other conditions.

I claim:

1. In an X-ray tube having an envelope and a support within the envelope, the combination of a rotary member carried by the support for rotation relative thereto, said rotary member and said support during operation of the tube expanding differentially, thereby producing relative longitudinal movement between said rotary member and said support, a target mounted on the member, and a pair of spaced bearings between the support and member, each bearing including inner and outer races, one race of each bearing being held against movement relative to the support lengthwise thereof and the other race of each of said bearings being held against movement relative to the rotary member lengthwise thereof, and rolling elements between the races, the races of one bearing having opposed channels in which the rolling elements are confined against movement in a direction lengthwise of the support and member and one race of the second bearing having a similar channel while the other race of the second bearing has a face permitting movement of the elements in contact therewith in said direction.

2. In an X-ray tube having an envelope and a support within the envelope, the combination of a rotary member carried by the support for rotation relative thereto, said rotary member and said support during operation of the tube expanding differentially, thereby producing relative longitudinal movement between said rotary member and said support, a target mounted on the member, and a pair of spaced bearings between the support and member, each bearing including inner and outer races, one race of each bearing being held against movement relative to the support lengthwise thereof and the other race of each of said bearings being held against movement relative to the rotary member lengthwise thereof, and rolling elements between the races, the races of the bearing near the free end of the support having opposed channels in which the rolling elements are confined against movement in a direction lengthwise of the support and member and one race of the second bearing having a similar channel while the other race of the second bearing has a face permitting movement of the elements in contact therewith in said direction.

3. In an X-ray tube having an envelope and a stem sealed through the envelope wall, the combination of a rotary member surrounding the stem, said rotary member and said support during operation of the tube expanding differentially, thereby producing relative longitudinal movement between said rotary member and said support, a target mounted on the member, and a pair of spaced bearings between the stem and member, each bearing including an inner and an outer race held against movement relative to the stem and member, respectively, in a direction lengthwise thereof and rolling elements between the races, the races of one bearing having opposed channels in which the rolling elements are confined against movement in said direction and one race of the other bearing having a similar channel while the other race has a face permitting the elements in contact therewith to move in said direction.

4. In an X-ray tube having an envelope and a stem sealed through the envelope wall, the combination of a cylindrical member into which the stem extends, the member being formed principally of metal having a coefficient of expansion different from that of the stem, a target mounted on the member, and a pair of spaced bearings between the stem and member, the bearings including inner and outer races mounted on the stem and within the member, respectively, and held against movement lengthwise thereof, and rolling bearing elements between the races, both races of one bearing and one race of the other having channels in their bearing-element-contacting faces in which the rolling elements are confined and the second race of said other bearing having a bearing-element-contacting face permitting the elements in contact therewith to move lengthwise of the stem.

5. In an X-ray tube having an envelope and a copper stem sealed through the envelope wall, the combination of a cylindrical member into which the stem extends, the member being formed principally of metal having a coefficient of expansion different from that of copper, a target mounted on the member, and a pair of spaced bearings between the stem and member, the bearings including inner and outer races mounted on the stem and within the cylindrical member, respectively, and held against movement lengthwise thereof, and rolling bearing elements between the races, both races of one bearing and the inner race of the other having channels in their bearing-element-contacting faces in which the rolling elements are confined and the outer race of said other bearing having a bearing-element-contacting face permitting the elements in contact therewith to move lengthwise of the stem.

6. In an X-ray tube having an envelope and a stem sealed through the envelope wall, the combination of a cylindrical member into which the stem extends, the member being made principally of a metal having a coefficient of expansion different from that of the stem, a target mounted on the member, bearings between the stem and member, each bearing including an inner race mounted on the stem, an outer race against the inner surface of the member, and rolling elements between the races, both races of one bearing and one race of the other having channels in which the elements are confined and the second race of said other bearing having a face permitting the elements in contact therewith to move lengthwise of the stem, means on the stem for holding the inner races against lengthwise movement relative thereto, and means on the member for holding the outer races against lengthwise movement relative thereto.

7. In an X-ray tube having an envelope and a copper stem sealed through the envelope wall, the combination of a cylindrical member into which the stem extends, the member being made principally of iron, a target mounted on the member, bearings between the stem and member, each bearing including an inner race mounted on the stem, an outer race against the inner surface of the member, and rolling bearing elements between the races, both races of the bearing near the free end of the stem having channels in which the elements are confined, the inner race of the other bearing having a similar channel and the outer race of said other bearing having a bearing-element-contacting face permitting the elements in contact therewith to move lengthwise of the stem, means engaging the outer races of the bearings and holding them against moving away from each other, means engaging the inner races of the bearings and holding them against moving away from each other, and separate means between the inner races and between the outer races for holding said respective races from moving toward each other.

8. In an X-ray tube having an envelope and a support within the envelope, the combination of a rotary member carried by the support for rotation relative thereto, said rotary member and said support during operation of the tube expanding differentially, thereby producing relative longitudinal movement between said rotary member and said support, a target mounted on the member, and bearings between the support and member, each bearing including a pair of races mounted immovably with respect to the support and member, respectively, and rolling elements between the races, one bearing supporting the member for free rotational movement only and the other supporting the member for free rotational and longitudinal movement.

9. In an X-ray tube having an envelope and an incandescent cathode and a support of good conductivity sealed through the envelope wall, the combination of a rotor carried by the support for rotation relative thereto within the envelope, a target mounted on the rotor and becoming highly heated in operation by impingement thereon of the electron beam from the cathode, the heat so generated flowing into the rotor and raising the temperature thereof, and a pair of spaced bearings between the rotor and the support, the bearings including inner and outer races and rolling elements between the races and constituting a heat transmitting path of low conductivity between the rotor and support whereby, during normal operation of the tube, the temperature of the rotor is higher than the temperature of the support and said support and said rotor expand differentially and produce relative longitudinal movement, the inner races of the bearings being mounted on the support, means on the support for holding the inner races from moving relatively in a direction lengthwise of the support, and means rotatable with the rotor for holding the outer races against relative movement in a direction lengthwise of the rotor, the opposed working faces of the races of one bearing and the working face of one race of the other having channels in which the rolling elements are received, while the working face of the remaining race is unchanneled.

10. In an X-ray tube having an envelope and a support within the envelope, the combination of a rotor carried by the support for rotation relative thereto, a target mounted on the rotor, bearings between the rotor and support, each bearing including inner and outer races and rolling elements between the races, the inner races of the bearings being mounted on the support, a sleeve on the support engaged by the inner races and preventing them from moving toward one another, means on the support for preventing the inner races from moving apart, and means within the rotor and movable therewith for engaging the adjacent and remote ends of the outer faces of the bearing to hold them in fixed relation, said means including a removable sleeve against portions of which the adjacent ends of the outer races abut, the opposed working faces of the races of one bearing and the working face of one race of the other bearing being channeled while the working face of the remaining race is unchanneled.

11. In an X-ray tube having an envelope and a support within the envelope, the combination of a rotor carried by the support for rotation relative thereto, a target mounted on the rotor, bearings between the rotor and support, each bearing including inner and outer races and rolling elements between the races, the inner races of the bearings being mounted on the support, a sleeve on the support engaged by the inner races and preventing them from moving toward one another, means on the support for preventing the inner races from moving apart, a removable sleeve within the rotor lying between the outer races and preventing them from moving toward one another, and means carried by the rotor for preventing the outer races from moving apart, the opposed working faces of the races of one bearing and the working face of one race of the other being channeled while the working face of the remaining race is unchanneled.

12. In an X-ray tube having an envelope and a support within the envelope, the combination of a rotor carried by the support for rotation relative thereto, a target mounted on the rotor, bearings between the rotor and support, each bearing including inner and outer races and rolling elements between the races, the inner races of the bearings being mounted on the support, a sleeve on the support engaged by the inner races and preventing them from moving toward one another, means on the support for preventing the inner races from moving apart, the outer races of the bearings being held against moving apart by a removable member on the rotor and a fixed part of the rotor, respectively, and a removable sleeve between the outer races and preventing them from moving toward one another, the opposed working faces of the races of one bearing and the working face of one race of the other being channeled while the working face of the remaining race is unchanneled.

RAYMOND R. MACHLETT.